United States Patent [19]

Kendall

[11] Patent Number: 4,851,166

[45] Date of Patent: Jul. 25, 1989

[54] PROCESS OF PRODUCING AN ORIENTED SILICONE RESIN COATED POLYMERIC FILM

[75] Inventor: Kenneth D. Kendall, Bridgwater, England

[73] Assignee: Courtaulds Films & Packaging (Holdings) Ltd., Somerset, England

[21] Appl. No.: 264,847

[22] Filed: Oct. 31, 1988

[30] Foreign Application Priority Data

Dec. 17, 1987 [GB] United Kingdom ................. 8729486

[51] Int. Cl.[4] ...................... B29C 55/04; B29C 41/30
[52] U.S. Cl. .................................. 264/22; 264/45.1; 264/46.1; 264/134; 264/236; 264/288.4; 264/290.2; 427/172; 427/173; 427/387
[58] Field of Search ............. 264/22, 134, 236, 288.4, 264/290.2, 45.1, 46.1; 427/172, 173, 387

[56] References Cited

U.S. PATENT DOCUMENTS

| | | | |
|---|---|---|---|
| 3,154,461 | 10/1964 | Johnson | 264/210.1 |
| 4,089,997 | 5/1978 | Van Paessche et al. | 427/172 |
| 4,310,600 | 1/1982 | Cros | 427/173 |
| 4,386,135 | 5/1983 | Campbell et al. | 427/387 |
| 4,476,166 | 10/1984 | Eckberg | 427/387 |
| 4,772,515 | 9/1988 | Hara et al. | 427/387 |

*Primary Examiner*—James Lowe
*Attorney, Agent, or Firm*—Bacon & Thomas

[57] ABSTRACT

The invention concerns the production of oriented polymeric films in which a layer of a heat curable silicone resin composition is formed on a layer of a polymeric film which is thereafter stretched at an elevated temperature to effect orientation of the film. The heat curable silicone resin composition includes a volatile inhibitor for inhibiting curing of the composition while stretching is effected. Suitable inhibitors include volatile amines, alkynes and acetylene alcohols. Films so produced can be used as release films.

14 Claims, No Drawings

PROCESS OF PRODUCING AN ORIENTED SILICONE RESIN COATED POLYMERIC FILM

PRODUCTION OF POLYMERIC FILMS

This invention concerns the production of polymeric films and in particular oriented polymeric release films.

Release papers are well known as temporary supports for tacky items such as labels and adhesive tapes prior to removal of the items from the temporary supports and fixing them in a desired final position. Such release papers have a paper or card base with a release layer of a material to which the items adhere lightly by their adhesive coated surfaces. The coating holds the items to the paper or card sufficiently securely for storage and transport but permits their ready release without significantly affecting the tackiness of the tacky adhesive surface. Commonly used materials for forming such release layers are silicone compounds.

Release papers are particularly useful in label dispensing machines in which pre-printed labels having a tacky surface are fixed temporarily to the release surface of a continuous reel of release paper. To dispense the labels, the release paper is delivered to a dispensing station where it is passed around a sharp angle to facilitate removal of the label from the paper by an edge tool, the label then being transferred to the article to which it is to be permanently fixed, for example a can of a foodstuff.

It has been proposed to use synthetic polymeric materials, for example polyesters or polypropylene, as a base support for the release layer in place of the paper or board. Synthetic polymeric films have the advantage over cellulosic materials in being more moisture resistant than paper or card, and therefore less likely to undergo undesirable dimensional changes. Polymeric films can usually also be guided around much sharper angles than can paper or card without the risk of tearing, and removal and transfer of the labels can therefore be accomplished more efficiently.

Synthetic polymeric films, for example of polyesters or polypropylene, are often stretched at a temperature between the second order transition temperature and about 5° C. below the first order transition temperature of the polymer at least partially to orient the molecular structure of the film and provide increased tensile strength and stiffness. The stretching can be uniaxial but often it is effected biaxially in directions at right angles to each other. Biaxial stretching is frequently effected sequentially, and it has been proposed to apply various coating compositions to the film between the stretching operations. Such methods have the economic advantage of providing coated films without the necessity for a separate off-line coating operation and associated heated dryer since the second stretching is effected at elevated temperatures.

Japanese Patent Application Publication No. 58/171916 (Tokyo Cellophane Paper Company Limited) describes the manufacture of a release film by stretching a polypropylene film in the longitudinal direction, coating one surface of the film with a thermosetting silicone resin, stretching the film in the transverse direction at an elevated temperature to cause curing of the resin, and thereafter heat setting and/or heat treating the film while the surface area of the film is permitted to contract by 15 to 30 percent and whitening of the surface of the film occurs.

In practice, the anchorage of cured silicone resins to synthetic polymeric films which are coated and stretched has been found to be unsatisfactory. If curing of the resin occurs before stretching is complete, differential movement between the base film and the cured resin causes the resin layer to crack and break up. If curing is delayed too long, it may not occur properly and the coating can then be rubbed off during subsequent processing, thus giving rise to an unacceptable release product.

According to the present invention there is provided a process for the production of an oriented polymeric film which process comprises forming a layer of a heat curable silicone resin composition on a surface of a polymeric film and thereafter stretching the film at an elevated temperature to effect orientation of the film, the heat curable silicone composition including a volatile inhibitor for inhibiting curing of the composition while stretching is effected.

It is preferred that sufficient of the volatile inhibitor should remain during the stretching of the film to inhibit curing of the composition until stretching of the film is substantially complete. This will be influenced by various factors, for example the volatility of the inhibitor, the amount of inhibitor present, the temperature at which the stretching is effected, and the length of time the film is subjected to the elevated temperature during the stretching. The amount of inhibitor present in the compositions is preferably from 0.1 to 5, more preferably from 0.2 to 2.0, and particularly from 0.1 to 1.0 percent by weight of the composition.

The volatile inhibitor serves to prevent curing of the heat curable composition when the film is heated in a stretching zone. The surface area of the film is initially relatively small compared with its area after stretching, and the loss of inhibitor by evaporation is relatively slow. On stretching the film, it is rapidly thinned, and its surface area rapidly increases so expanding and thinning the layer of the composition so that rapid evaporation of the inhibitor takes place. When the inhibitor has been substantially removed by evaporation, curing of the composition can occur under the influence of heat. Provided the amount of inhibitor in the composition has been correctly selected, curing can be arranged to coincide substantially with the end of the stretching operation, resulting in a coherent layer of solid silicone resin secured to the base polymeric film.

The volatile inhibitor will usually depend on the heat curable silicone resin used. Examples of inhibitors which can be used include volatile amines, volatile alkynes, and volatile acetylenic alcohols. A particularly preferred inhibitor is mono-ethanolamine. Such inhibitors are usually effective in inhibiting the catalytic action of organometallic curing catalysts, for example platinum-containing catalysts, e.g. hexachloroplatinic acid.

Preferred heat curable silicones for use in accordance with the invention include dialkyl (e.g. methyl) silicone fluids with vinyl functionality and alkyl (e.g. methyl) aryl (e.g. phenyl) silicone fluids with vinyl functionality in combination with minor amounts of alkyl (e.g. methyl) hydrogen or aryl (e.g. phenyl) hydrogen silicones as cross-linking agents. Such cross-linking agents will usually be present in an amount of less than 20, and preferably less than 10, percent by weight of the heat curable composition.

Stretching of the film can be effected at temperatures conventionally used to effect orientation of the synthetic polymer used to form the base film. It will, however, usually be from 100 to 180° C., the silicone fluids referred to above usually cross-linking in this temperature range.

Polymeric films which can be treated in accordance with the present invention include polyester films and polypropylene films. These latter being particularly preferred by virtue of their flatness and stiffness following orientation, which properties make them especially suitable for producing release films.

When polypropylene films are subjected to a process in accordance with the present invention, it is preferred to effect stretching of the film with the curable composition thereon at a temperature of from 150 to 170° C.

Conventional stretch ratios can be used, for example from 8:1 to 10:1 for polypropylene films.

Following stretching of the film, it can be heat set by allowing the film to contract by up to 10, and preferably up to 5, percent of its fully stretched dimension in the direction of stretch while holding the film at an elevated temperature.

In a preferred embodiment of the invention, polypropylene film is stretched in the longitudinal direction over sets of rollers, the film is coated with a heat curable silicone resin composition containing a curing inhibitor, and it is then stretched in the transverse direction using a stenter. Heat setting is preferably effected in a heated zone within the stenter following the stretching zone. The heat curable composition can conveniently be applied to the lower surface of the polypropylene film immediately before the film enters the stenter using an off-set smooth roller coater.

The present invention can be used to produce voided or non-voided oriented synthetic polymeric release film. Voided film having a density below that of the polymer from which it is produced can be formed by the inclusion of inorganic particles, for example calcium carbonate, or polymeric particles into a melt of the polymer used to form the film prior to extrusion and subsequent stretching. U.S. Pat. No. 3154461 describes the formation of voids by this technique. Voids can also be formed by including in the film a particulate blowing agent which is activated under the conditions of extrusion of the film.

Films having voids therein generally have an opaque silvery appearance which forms a suitable background in release applications where the position of items such as labels attached to the surface of the release film can be detected by photoelectric means.

The synthetic polymeric film can be a single layer, for example of polypropylene homopolymer, or it can consist of two or more polymeric layers. Examples of other layers which can be used include polymers of propylene containing units derived from ethylene and/or but-1-ene. When present, such other layers can be used, for example, to improve anchorage of the cured silicone resin composition to the base film or they can be used to impart heat seal properties to the film on the uncoated face. When the film consists of two or more layers, they can be formed by coextrusion.

The surface of the polymeric film to which the curable silicone resin composition is applied can be pretreated with corona discharge or a flame to improve the anchorage of the cured composition to the film. Such treatments are preferably effected immediately before application of the curable composition.

After curing of the composition the film can be wound into a roll. Subsequently the roll can be unwound and the cured resin layer can have a layer of adhesive applied thereto, for example as is commonly used for self adhesive labels and tapes, e.g. a polyacrylate composition. Continuous label stock or a base tape film can then be applied to the adhesive to which they bind permanently. The combination of release film and temporarily adhered tacky items can then be wound into a roll.

The following Example is given by way of illustration only. All parts are percent by weight of the total composition unless otherwise stated.

EXAMPLE

A freshly coextruded film of polypropylene homopolymer having outer layers on each side of a propylene/ethylene copolymer containing 4 percent by weight of copolymerised ethylene was quenched by a chill roll. The film was then heated and stretched longitudinally in the direction of extrusion (machine direction) by passing it over two sets of rollers, the second set having a higher peripheral speed than that of the first set, and the rollers being heated to bring the film to a temperature of 110° C. The difference in peripheral speeds of the two sets of rollers was adjusted to give a stretch ratio of 4.5:1.

The uniaxially stretched film was reduced in temperature by passage through the air, and it was then coated on its under surface with a heat curable silicone resin composition using an off-set smooth roller coater. The composition consisted of:

| | |
|---|---|
| non-aqueous dimethyl silicone fluid with vinyl functionality (Wacker Chemicals Ltd. - Si-Dehasiv 920) | 88.6 |
| methyl hydrogen silicone cross-linking agent (Wacker Chemicals Ltd. - V90) | 2.7 |
| platinum-containing curing catalyst (Wacker Chemicals Ltd. - VP1505) | 8.0 |
| mono-ethanolamine | 0.7 |

The composition readily wetted the film and it formed a thin layer on its under surface.

The coated film was then stretched transversely at a ratio of 10:1 in a stenter at a temperature of 160° C. The surface area of the film increased rapidly, and the mono-ethanolamine evaporated at a rapidly increasing rate until it had been totally expelled when curing of the composition occurred. The film was then heat set by relaxing its width by 7 percent before leaving the heated zone of the stenter. The edges of the film were trimmed, and the film was wound into a roll.

The concentration of mono-ethanolamine in the curable composition was adjusted to ensure that curing of the composition was effected after the stretching but before wind-up.

The cured silicone resin layer on the film was smooth and substantially free from blemishes. Adhesive coated films and label stock adhered lightly to the coated surface and they could be readily removed without damage to the tacky coatings.

I claim:

1. A process for the production of an oriented polymeric film which process comprises forming a layer of a heat curable silicone resin composition on a surface of a polymeric film and thereafter stretching the film at an elevated temperature to effect orientation of the film, the heat curable silicone composition including a volatile inhibitor for inhibiting curing of the composition while stretching is effected.

2. A process according to claim 1, wherein the volatile inhibitor is present in the composition in an amount sufficient to inhibit curing thereof until the said stretching is substantially complete.

3. A process according to claim 1, wherein the volatile inhibitor comprises a volatile amine, a volatile alkyne, or a volatile acetylene alcohol.

4. A process according to claim 3, wherein the volatile amine is mono-ethanolamine.

5. A process according to claim 3, wherein the heat curable silicone resin composition includes an organometallic catalyst for catalysing heat curing of the composition.

6. A process according to claim 5, wherein the catalyst is a platinum-containing compound.

7. A process according to claim 1, wherein the heat curable silicone of the composition comprises a dialkyl or alkyl aryl silicone fluid having vinyl functionality.

8. A process according to claim 7, wherein the composition contains a minor amount of an alkyl hydrogen or an aryl hydrogen silicone as a cross-linking agent.

9. A process according to claim 1, wherein the film is stretched to effect orientation in one direction before the heat curable silicone resin composition is applied and the film is thereafter oriented in another direction.

10. A process according to claim 1, wherein the film is subjected to a corona discharge treatment before the heat curable composition is applied.

11. A process according to claim 1, wherein the film is heat set after curing of the composition.

12. A process according to claim 1, wherein the film is a polypropylene film.

13. A process according to claim 1, wherein the polymeric film comprises two or more layers.

14. A process according to claim 1, wherein the polymeric film after stretching has voids therein.

* * * * *